(12) United States Patent
Tang

(10) Patent No.: US 12,619,231 B2
(45) Date of Patent: May 5, 2026

(54) METHOD, DEVICE, STORAGE MEDIUM, AND ELECTRONIC DEVICE FOR CONTROLLING FLIGHT EQUIPMENT

(71) Applicant: AUTEL ROBOTICS CO., LTD., Shenzhen (CN)

(72) Inventor: Pengcheng Tang, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 193 days.

(21) Appl. No.: 18/490,915

(22) Filed: Oct. 20, 2023

(65) Prior Publication Data

US 2024/0134375 A1 Apr. 25, 2024
US 2024/0231357 A9 Jul. 11, 2024

(30) Foreign Application Priority Data

Oct. 21, 2022 (CN) .......................... 202211296677.5

(51) Int. Cl.
*G05D 1/00* (2024.01)
*G05D 1/606* (2024.01)
*G05D 1/87* (2024.01)

(52) U.S. Cl.
CPC ........... *G05D 1/0077* (2013.01); *G05D 1/106* (2019.05); *G05D 1/606* (2024.01); *G05D 1/87* (2024.01)

(58) Field of Classification Search
CPC ...... G05D 1/0077; G05D 1/106; G05D 1/606; G05D 1/87; G05D 1/2246; G05D 1/248; G05D 2109/254; G05D 1/857
See application file for complete search history.

(56) References Cited

U.S. PATENT DOCUMENTS

| | | | |
|---|---|---|---|
| 2014/0025230 A1* | 1/2014 | Levien | A63H 27/12 |
| | | | 701/2 |
| 2017/0041066 A1* | 2/2017 | Chu | H04B 7/18502 |
| 2017/0300717 A1* | 10/2017 | Hu | H04B 7/0608 |
| 2018/0275654 A1* | 9/2018 | Merz | G01S 13/933 |

(Continued)

FOREIGN PATENT DOCUMENTS

| | | |
|---|---|---|
| CN | 106184753 A | 12/2016 |
| CN | 112000118 A | 11/2020 |

(Continued)

OTHER PUBLICATIONS

First Chinese Office Action dated Nov. 21, 2024; Appln. No. 2022112966775 with English Translation.

*Primary Examiner* — Anne Marie Antonucci
*Assistant Examiner* — Luis G Del Valle
(74) *Attorney, Agent, or Firm* — Frank Gao, Esq.

(57) ABSTRACT

Embodiments of the present application provide a method, device, storage medium, and electronic device for controlling flight equipment, wherein the method includes: acquiring positioning position information from a positioning system deployed on a target flight equipment; detecting an operating state of the positioning system according to positioning position information, wherein the operating state comprises: normal state and abnormal state; when the operating state is an abnormal state, controlling the target flight equipment to return to a ground control terminal according to the relative position information between the target flight equipment and the ground control terminal of the target flight equipment.

17 Claims, 6 Drawing Sheets

Target flight equipment

Receiving antenna B

Receiving antenna A

Signal receiving path A

Signal receiving path B

Ground control terminal

(56) References Cited

U.S. PATENT DOCUMENTS

| | | | |
|---|---|---|---|
| 2018/0321676 A1* | 11/2018 | Matuszeski | B64C 39/024 |
| 2021/0053680 A1* | 2/2021 | Prest | G05D 1/0011 |
| 2023/0273021 A1* | 8/2023 | Tomii | B63C 11/48 |
| | | | 367/88 |
| 2023/0396319 A1* | 12/2023 | Lambert | H04B 7/18504 |
| 2024/0093827 A1* | 3/2024 | Wang | F16L 55/48 |

FOREIGN PATENT DOCUMENTS

| | | |
|---|---|---|
| CN | 112698663 A | 4/2021 |
| CN | 114729807 A | 7/2022 |
| WO | 2020143004 A1 | 7/2020 |

* cited by examiner

Blade
104

Vehicle
body 102

Memory
108

Processor
106

Camera
equipment
112

Transmission
equipment 110

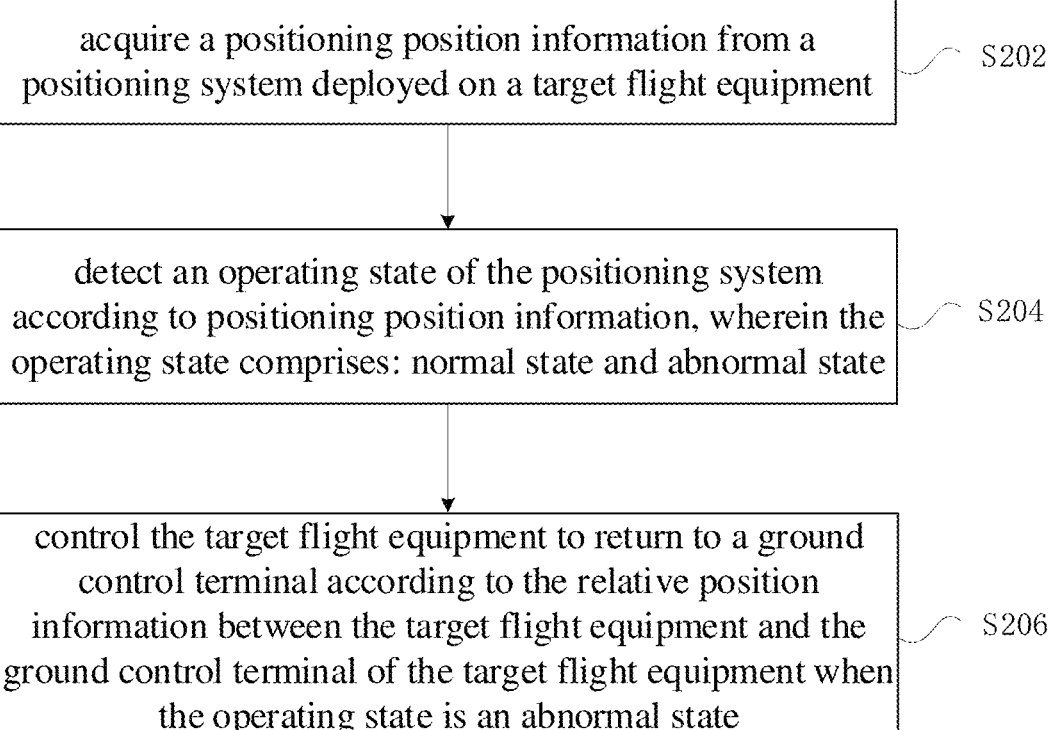

acquire a positioning position information from a positioning system deployed on a target flight equipment ⟋ S202 detect an operating state of the positioning system according to positioning position information, wherein the operating state comprises: normal state and abnormal state ⟋ S204 control the target flight equipment to return to a ground control terminal according to the relative position information between the target flight equipment and the ground control terminal of the target flight equipment when the operating state is an abnormal state ⟋ S206

FIG. 2

METHOD, DEVICE, STORAGE MEDIUM, AND ELECTRONIC DEVICE FOR CONTROLLING FLIGHT EQUIPMENT

CROSS REFERENCE TO RELATED DISCLOSURE

This application is based upon and claims priority to Chinese patent Application No. 202211296677.5 filed on Oct. 21, 2022, which is incorporated herein in its entirety by reference for all purposes.

BACKGROUND

At present, the navigation technologies used on unmanned aerial vehicles (UAVs) mainly include: inertial navigation, satellite navigation, doppler navigation, visual-assisted navigation, terrain-assisted navigation, and geo-magnetic navigation, each of these navigation technologies has its own advantages and disadvantages. In the prior art, small UAVs mainly used satellite GPS (Global Positioning System) to realize the navigation and positioning of UAVs. However, the GPS signal of satellite GPS navigation is easily interfered with. During the flight mission of a UAV, if the GPS signal is interfered with, the accuracy of satellite GPS navigation may be low or unavailable, which may cause the UAV to be out of control or even fry.

There is no effective solution to the problem in the related art that the safety of flight equipment control is low when positioning navigation fails.

SUMMARY

Embodiments of the present disclosure relate to the technical field of aircraft, and more particularly, to a method, device, storage medium, and electronic device for controlling flight equipment.

The present disclosure provide a method, device, storage medium, and electronic device for controlling a flight equipment to solve at least the problem of low safety in controlling the flight equipment in the event of a failure in positioning navigation in the related art.

According to the first aspect of the present disclosure, there is provided a method for controlling a flight equipment, comprising:

acquiring a positioning position information from a positioning system deployed on a target flight equipment;

detecting an operating state of the positioning system according to positioning position information, wherein the operating state comprises: normal state and abnormal state;

controlling the target flight equipment to return to a ground control terminal according to the relative position information between the target flight equipment and the ground control terminal of the target flight equipment when the operating state is an abnormal state.

According to the second embodiment of the present disclosure, there is also provided a device for controlling a flight equipment, including:

an acquisition module for acquiring a positioning position information from a positioning system deployed on a target flight equipment;

a detection module for detecting an operating state of the positioning system according to positioning position information, wherein the operating state comprises: normal state and abnormal state;

a control module for controlling the target flight equipment to return to a ground control terminal according to the relative position information between the target flight equipment and the ground control terminal of the target flight equipment when the operating state is an abnormal state.

According to the third aspect of the present disclosure, there is also provided a non-transitory computer readable storage medium having stored therein a computer program, wherein the computer program is arranged to perform the steps in any of the above method embodiments when run.

According to the forth embodiment of the present disclosure, there is also provided an electronic device comprising a memory and a processor, the memory having stored therein a computer program, the processor being arranged to run the computer program to perform the steps in any of the method embodiments described above.

BRIEF DESCRIPTION OF THE DRAWINGS

FIG. 2 is a flow chart of a method for controlling a flight equipment according to an embodiment of the present application;

DETAILED DESCRIPTION

Hereinafter, embodiments of the present application will be described in detail in conjunction with the embodiments with reference to the accompanying drawings.

It is noted that the terms "first", "second", and the like in the description and the claims of the present application and in the above-described drawings are used for distinguishing between similar objects and not necessarily for describing a particular sequential or chronological order.

Figure 1:
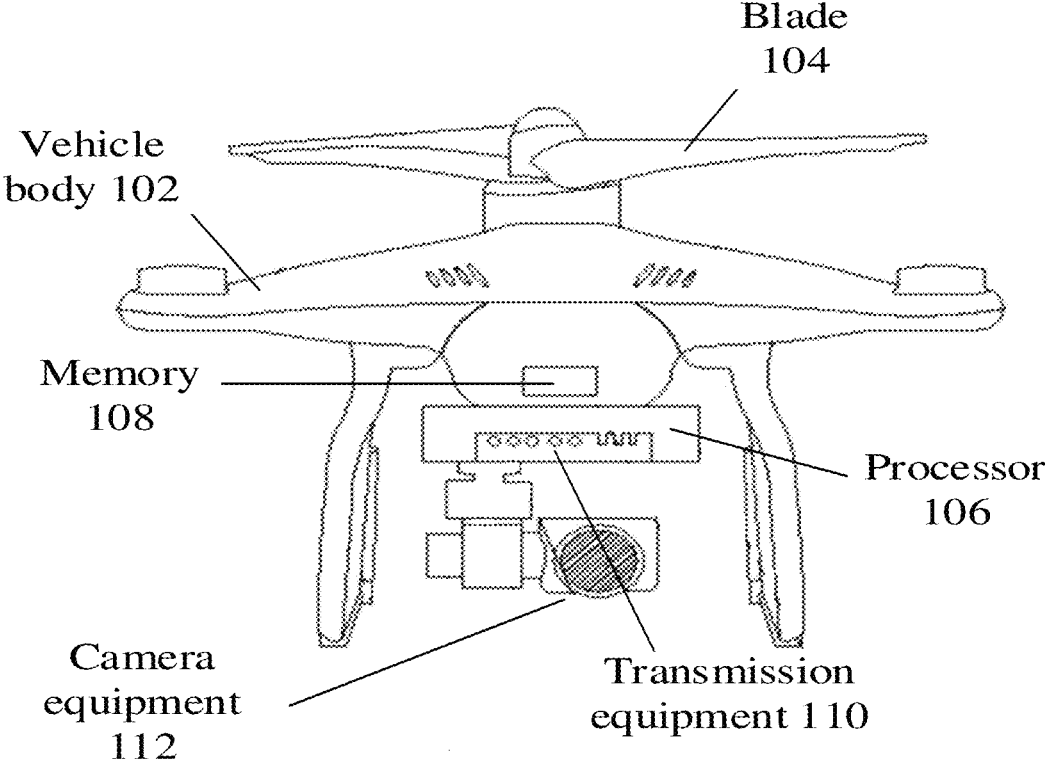
FIG. 1 is a block diagram of a hardware structure of a terminal equipment of a method for controlling a flight equipment according to an embodiment of the present application.

The method embodiments provided in the embodiments of the present application may be implemented in a UAV, aircraft, or similar terminal equipment. Taking the operation of a UAV as an example, FIG. 1 is a block diagram of the hardware structure of a terminal equipment of a method for controlling a flight equipment according to an embodiment of the present application. As shown in FIG. 1, the UAV includes a vehicle body 102, a blade 104, and may further include one or more (only one shown in FIG. 1) processors 106 (which may include, but are not limited to, processing devices such as a microprocessor MCU or a programmable logic device FPGA) and a memory 108 for storing data, wherein the UAV may further include a transmission equipment 110 for communication functions and one or more camera equipment 112 (only one shown in FIG. 1). It will be understood by those of ordinary skill in the art that the configuration shown in FIG. 1 is merely illustrative and does not limit the configuration of the mobile terminal described above. For example, the UAV may also include more or fewer components than shown in FIG. 1, or have a different configuration than shown in FIG. 1.

The memory 108 may be used to store a computer program, e.g. a software program and modules of application software, such as a computer program corresponding to the method for controlling the flight equipment in the embodiment of the present application, and the processor 106 executes the computer program stored in the memory 108 to perform various functional applications and data processing, i.e. to implement the method described above. The memory 108 may be high-speed random access memory, and may also include non-volatile memory, such as one or more magnetic storage devices, flash memory, or other non-volatile solid-state memory. In some instances, memory 108 may further include memory remotely located with respect to the processor 106, which may be connected to the UAV via a network. Examples of such networks include, but are not limited to, the Internet, intranets, local area networks, mobile communication networks, and combinations thereof.

The transmission equipment 110 is used to receive or transmit data via a network. In one example, the transmission equipment 110 may be a Radio Frequency (RF) module for communicating wirelessly with the Internet.

In the present embodiment, there is provided a flight equipment is provided. FIG. 2 is a flow chart of a method for controlling a flight equipment according to an embodiment of the present application. As shown in FIG. 2, the flow chart comprises the following steps:

step S202, acquiring a positioning position information from a positioning system deployed on a target flight equipment;

step S204, detecting an operating state of the positioning system according to positioning position information, wherein the operating state comprises: normal state and abnormal state; and step S206, controlling the target flight equipment to return to a ground control terminal according to the relative position information between the target flight equipment and the ground control terminal of the target flight equipment when the operating state is an abnormal state.

In the present application, firstly, positioning position information about the target flight equipment is acquired from the positioning system deployed on the target flight equipment, and then the operating state of the positioning system is detected to be a normal state or an abnormal state according to the positioning position information; when the operating state of the positioning system of the target flight equipment is an abnormal state, controlling the target flight equipment to return to a ground control terminal according to the relative position information between the target flight equipment and the ground control terminal of the target flight equipment. That is to say, the positioning system on the target flight equipment can be monitored, and if there is a situation where the positioning system on the target flight equipment is abnormal, the target flight equipment can be controlled to return to the ground control terminal of the target flight equipment according to the position information (namely, relative position information) of the target flight equipment relative to the ground control terminal thereof, to ensure that the target flight equipment can safely reach the ground control terminal even in a state where the positioning system is abnormal. Therefore, it is possible to solve the problem of a lower safety flight equipment control when positioning navigation fails, achieving the effect of improving the safety of flight equipment control when positioning navigation fails.

Alternatively, in the present embodiment, the method for controlling the flight equipment described above may be applied to but is not limited to, a product or program having a control function of the flight equipment. For example: A central processor of the flight equipment, a remote control terminal of the flight equipment, or a program deployed on these products.

In the solution provided by step S202 above, the target flight equipment may be but is not limited to, any type of aircraft that is allowed to have a signal-receiving function. For example: UAVs, conventional aircraft, etc.

Alternatively, in this embodiment, the positioning system is used to obtain positioning position information about the target flight equipment, which may be but is not limited to, a navigation system deployed on the target flight equipment that allows positioning position information to be obtained. For example: inertial navigation systems, satellite navigation systems, doppler navigation systems, and geomagnetic navigation systems, etc.

Alternatively, in this embodiment, the positioning position information is the position of the target flight equipment in the positioning system, which may be but is not limited to, obtained in real time by the positioning system deployed on the target flight equipment. For example: the target flight equipment acquires positioning position information about the target flight equipment in the positioning system by using the positioning system deployed on the target flight equipment during the execution of the mission. The positioning position information about the target flight equipment can be represented by coordinates, such as: in the GPS positioning system, the target flight equipment acquires its three-dimensional position information in the global positioning system through three-dimensional coordinates.

In the technical solution provided in the above-mentioned step S204, the operating state of the positioning system can be detected by positioning position information but is not limited to. The positioning position information may be but is not limited to, acquired by the positioning system, and the operating state of the positioning system may be, but is not limited to, determined based on the acquired positioning position information. For example: in the case where the target flight equipment can stably acquire the positioning position information from the positioning system within a period of time, it is determined that the operating state of the positioning system is a normal state. Or determining that the operating state of the positioning system is an abnormal state in case of failure to acquire positioning position information or low accuracy of the positioning position information.

Alternatively, in this embodiment, it is possible, but not limited to, to detect the positioning position information about the target flight equipment in multiple dimensions to determine whether the operating state of the positioning system is normal or abnormal. For example: according to the persistence of acquiring positioning position information, in the case where the positioning system can continuously acquire positioning position information within a period of time, it is determined that the operating state of the positioning system is a normal state; otherwise, it is determined that the operating state of the positioning system is an abnormal state. Alternatively, depending on the accuracy of the acquired positioning position information, in case the accuracy of the acquired positioning position information is low (e.g. below a certain threshold), it is determined that the operating state of the positioning system is an abnormal state. In case the accuracy of the acquired positioning position information is high (e.g. above a certain threshold), it is determined that the operating state of the positioning system is a normal state.

In an exemplary embodiment, the operating state of the positioning system may be detected in, but is not limited to, the following manner: determining the availability of the positioning system according to the stability of the positioning position information; determining the operating state to be the abnormal state if the availability is below a target threshold.

Optionally, in this embodiment, the stability of the positioning position information is used to determine whether a positioning system is available, which may be but is not limited to, determined from positioning position information acquired by the positioning system of the target flight equipment. For example: firstly, a precision threshold value is set for the accuracy of the positioning position information acquired by the positioning system of the target flight equipment, and when the difference of the positioning position information at adjacent time points falls within the precision threshold value, the accuracy of the positioning position information can be considered to be in a normal state; secondly, setting a time threshold value for the time when the positioning position information is continuously acquired by the positioning system of the target flight equipment, and accumulating the positioning position information with a normal accuracy; and when the time when the positioning position information with a normal accuracy is continuously acquired falls within the time threshold value, it can be determined that the positioning position information acquired by the positioning system of the target flight equipment is in a stable state.

Alternatively, in the present embodiment, the availability of the positioning system is used to indicate the operating state of the target flight equipment positioning system, which may be, but is not limited to, determined based on the stability of the positioning position information, and the operating state of the positioning system may be but is not limited to, determined based on whether the availability of the positioning system falls within a target threshold. For example: acquiring positioning position information about the target flight equipment via a positioning system; when the positioning position information cannot be acquired or there is an obvious error in the acquired positioning position information, the stability of the positioning position information is low, at this moment, the availability of the positioning system is less than a target threshold value, and determining that the operating state of the positioning system is an abnormal state.

In the solution provided by the above-mentioned step S206, the above-mentioned ground control terminal is used for controlling the target flight equipment, which may be but is not limited to, a mobile terminal, a computer, a control handle, and the like which are allowed to have a signal transmission function.

Figure 3:
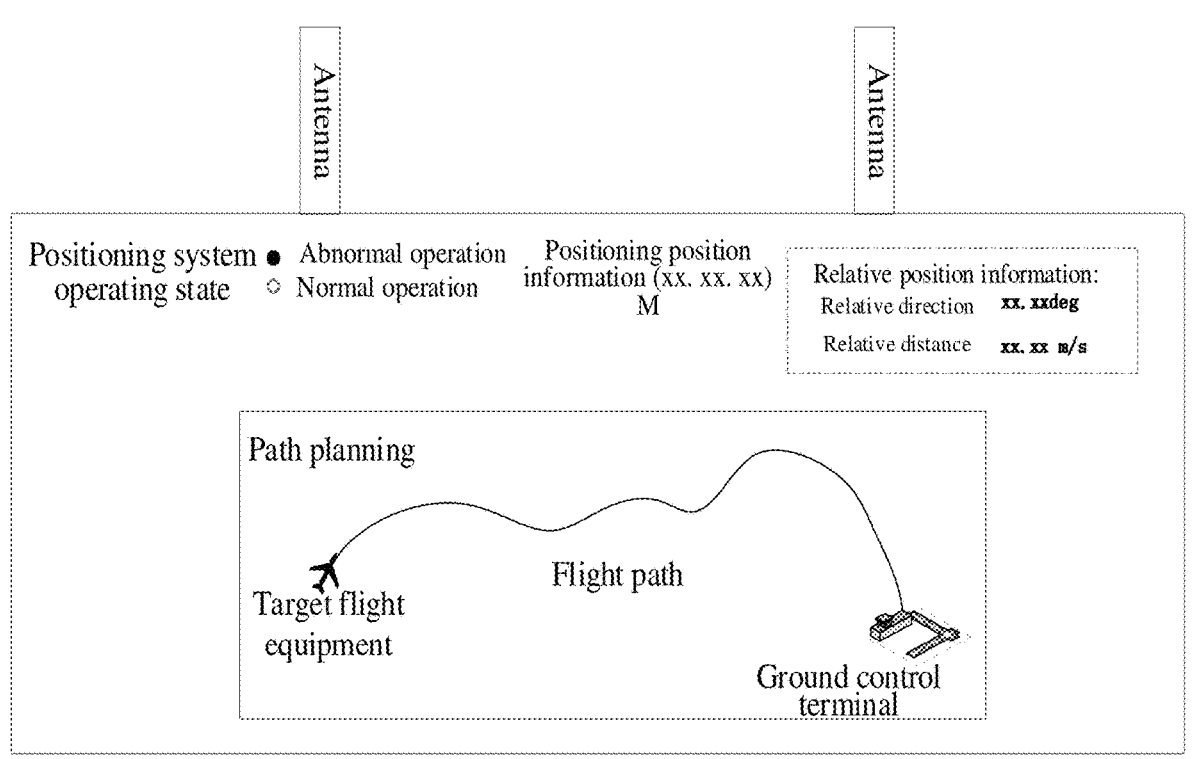
FIG. 3 is a schematic view of a ground control terminal acquiring relative position information according to an embodiment of the present application.

Alternatively, in the present embodiment, FIG. 3 is a schematic view of a ground control terminal acquiring relative position information according to an embodiment of the present application; as shown in FIG. 3, positioning position information obtained by positioning a target flight equipment via a positioning system on the target flight equipment can be displayed on the ground control terminal in the form of three-dimensional coordinates; and when the operating state of the positioning system is an abnormal state (such as a failure to acquire positioning position information), the target flight equipment can automatically acquire relative position information about the target flight equipment and the ground control terminal, and plan a return path according to the relative position information. The flight equipment returns to the ground control terminal according to the return path control target, in which the relative position information and return path content can be displayed on the ground control terminal.

Alternatively, in the present embodiment, the relative position information is used to indicate a positional relationship between the target flight equipment and the ground control terminal, which may be, but is not limited to, determined from a wireless signal between the target flight equipment and the ground control terminal, and the relative position information may include but is not limited to, any information about the relative positional relationship between the target flight equipment and the ground control terminal, such as relative distance, relative coordinate, relative angle, relative speed, etc. For example: the target flight equipment receives radio signals from the ground control terminal through antennas with different orientations and determines relative position information between the radio signals and the ground control terminal according to their strengths and weaknesses.

In an exemplary embodiment, according to the relative position information between the target flight equipment and the ground control terminal of the target flight equipment, the return of the target flight equipment to the ground control terminal may be controlled in but is not limited to, the following manner: determining the relative position information according to signal information about a flight control signal sent by the ground control terminal to the target flight equipment and antenna position information about the target flight equipment, wherein the antenna position information is used for indicating a deployment position of a receiving antenna receiving the flight control signal on the target flight equipment; planning a target return path of the target flight equipment according to the relative position information; controlling the target flight equipment to return to a ground control terminal according to the target return path.

Alternatively, in the present embodiment, the flight control signal may be but is not limited to, any signal transmitted by the ground control terminal to the target flight equipment and having a flight function for controlling the target flight equipment, which may be, but is not limited to, a signal transmitted by the ground control terminal to the target flight equipment and carrying control information. For example: during the execution of the flight task by the target flight equipment, the control person needs to re-plan the flight path of the target flight equipment according to the execution condition of the flight task, and the control target flight equipment executes the flight task according to the re-planned target flight path, namely, a flight control signal with information about the re-planned target flight path can be sent to the target flight equipment via the ground control terminal to achieve the purpose of controlling the target flight equipment to execute the flight task according to the re-planned target flight path. The relative position information between the target flight equipment and the ground control terminal may be determined based on the flight control signal for re-planning the flight path if the positioning system of the target flight equipment is operating abnormally.

Alternatively, in this embodiment, the signal information of the flight control signal may be but is not limited to, information extracted from the flight control signal that is capable of reflecting the relative positional relationship between the target flight equipment and the ground control terminal, such as: signal strength, signal angle, degree of signal attenuation, etc.

Optionally, in the present embodiment, the antenna position information is used to indicate the position of a receiving antenna deployed on the target flight equipment for receiving signals, which may be but is not limited to, already preset at the time the target flight equipment leaves the factory, such as the location where the receiving antenna needs to be deployed is determined at the time of production of the target flight equipment, and the antenna position information of the receiving antenna is stored in the memory of the target flight equipment at the time of delivery, or the antenna position information of the receiving antenna on the target flight equipment is set at the ground control terminal.

Optionally, in this embodiment, the relative position information is used to indicate a positional relationship between the target flight equipment and the ground control terminal, which may be, but is not limited to, jointly determined from signal information of the flight control signal and antenna position information of the target flight equipment. For example: the target flight equipment determines an initial distance between the receiving antenna receiving the flight control signal and the ground control terminal according to the signal information about the flight control signal sent by the ground control terminal, then calibrates the initial distance according to the antenna position information to obtain a target distance between the target flight equipment and the ground control terminal, and finally determines the direction of the ground control terminal relative to the target flight equipment according to the strength of the flight control signal received by the receiving antenna, to obtain relative position information between the target flight equipment and the ground control terminal.

Alternatively, in the present embodiment, the target return path is used to instruct the target flight equipment to return to the ground control terminal according to the relative position information, namely, the target flight equipment can return to the ground control terminal by flying according to the target return path, and the target return path can be planned according to the relative position information, such as: the target flight equipment plans a return path to the ground control terminal, namely, a target return path, according to the acquired relative position information with the ground control terminal, and flies along the target return path to the ground control terminal.

Optionally, in the present embodiment, the target flight equipment receives a flight control signal sent by the ground control terminal, determines relative position information about the target flight equipment and the ground control terminal according to signal information about the flight control signal and position information about a receiving antenna deployed on the target flight equipment, and at the same time, the target return path of the target flight equipment can be planned according to the relative position information when the target flight equipment obtains the relative position information about the ground control terminal, and the target flight equipment can return to the ground control terminal by flying along the planned target return path; this ensures the safety of the target flight equipment in the event of an anomaly in the positioning system.

In an exemplary embodiment, according to signal information about a flight control signal sent by the ground control terminal to the target flight equipment and antenna position information about the target flight equipment, the relative position information may be determined in, but is not limited to, the following manner: determining a signal strength of the flight control signal received by each of a plurality of the receiving antennas deployed on the target flight equipment, and the deployment position of each of the receiving antennas, to obtain a plurality of sets of the deployment positions and the signal strength having corresponding relationships, wherein the signal information comprises the signal strength; determining a relative distance and a relative direction as the relative position information, wherein the relative direction is a direction of the target flight equipment relative to the ground control terminal and the relative distance is a distance of the target flight equipment relative to the ground control terminal, according to the plurality of sets of the deployment positions and the signal strengths having corresponding relationships.

Alternatively, in the present embodiment, the signal strength is used to indicate the strength of the flight control signal received by each receiving antenna deployed on the target flight equipment, wherein multiple receiving antennas may be deployed on the target flight equipment, and the signal strength of the flight control signal received by each receiving antenna deployed on the target flight equipment may be different. For—example: a receiving antenna is deployed at a plurality of positions on the target flight equipment, the angle and distance of the receiving antenna relative to the ground control terminal are different according to the deployed position thereof, and the signal strength of the flight control signal received by the receiving antenna nearest to the ground control terminal is the strongest.

Optionally, in this embodiment, the deployment position is used to indicate position information of the receiving antenna deployed on the target flight equipment, which may be but is not limited to, preset fixed parameters. For example: in the design of target flying equipment, the deployment position of its receiving antenna is determined, and in the production, the receiving antenna is installed according to the pre-planned deployment position. Or change the deployment position at which the receiving antenna is deployed during the use of the target flight equipment in order to perform the corresponding flying task.

Figure 4:
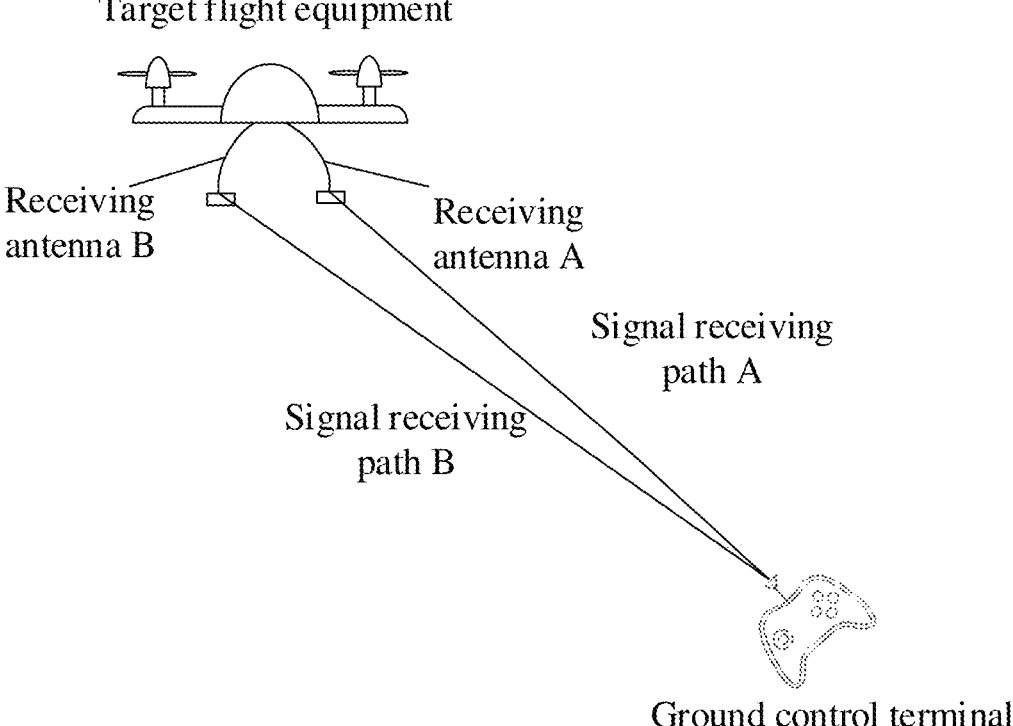
FIG. 4 is a schematic view of a corresponding relationship between a deployment position and signal strength according to an embodiment of the present application.

Alternatively, in this embodiment, the deployment positions and signal strengths may be but are not limited to, in a one-to-one correspondence. FIG. 4 is a schematic view of a corresponding relationship between a deployment position and signal strength according to an embodiment of the present application, as shown in FIG. 4, a ground control terminal sends a flight control signal to a target flight equipment; a receiving antenna A and a receiving antenna B of the target flight equipment respectively receive the same control signal via a signal receiving path A and a signal receiving path B; the length of the signal receiving path A is less than the length of the signal receiving path B; therefore, the signal strength of the deployment position of the receiving antenna A is greater than the signal strength of the deployment position of the receiving antenna B; therefore, the deployment position A deploys a control signal of which the signal strength A is received by the receiving antenna A; deployment position B deploys a control signal of received signal strength B by receive antenna B.

In an exemplary embodiment, controlling the target flight equipment to return to a ground control terminal according to the relative position information between the target flight equipment and the ground control terminal of the target flight equipment comprises: determining the relative position information according to signal information about a flight control signal sent by the ground control terminal to the target flight equipment and antenna position information about the target flight equipment, wherein the antenna position information is used for indicating the deployment position of a receiving antenna receiving the flight control signal on the target flight equipment; planning a target return path of the target flight equipment according to the relative position information; controlling the target flight equipment to return to a ground control terminal according to the target return path.

In an exemplary embodiment, determining the relative position information according to signal information about a flight control signal sent by the ground control terminal to the target flight equipment and antenna position information about the target flight equipment comprises:determining a signal strength of the flight control signal received by each of a plurality of the receiving antennas deployed on the target flight equipment, and the deployment position of each of the receiving antennas, to obtain a plurality of sets of the deployment positions and the signal strength having corresponding relationships, wherein the signal information comprises the signal strength; determining a relative distance and a relative direction as the relative position information, wherein the relative direction is the direction of the target flight equipment relative to the ground control terminal and the relative distance is the distance of the target flight equipment relative to the ground control terminal, according to the plurality of sets of the deployment positions and the signal strengths having corresponding relationships.

In an exemplary embodiment, planning a target return path of the target flight equipment according to the relative position information comprises:planning a return direction of the target flight equipment based on a relative direction included in the relative position information, wherein the relative direction is the direction of the target flight equipment relative to the ground control terminal; planning the target return path according to the relative distance included in the relative position information and the return direction.

In an exemplary embodiment, planning a target return path of the target flight equipment according to the relative position information comprises: planning a first return path of the target flight equipment according to the relative position information; acquiring an altitude information about the target flight equipment, wherein the altitude information is information collected by an altitude sensor deployed on the target flight equipment; adjusting the first return path according to the altitude information to obtain the target return path, wherein the altitude information is used for controlling the flight altitude of the target flight equipment during the return.

In an exemplary embodiment, planning a target return path of the target flight equipment according to the relative position information comprises: planning a second return path of the target flight equipment according to the relative position information; acquiring a visual information about the target flight equipment, wherein the visual information is information collected by a visual sensor deployed on the target flight equipment; determining an obstacle information on the second return path according to the visual information; adjusting the second return path according to the obstacle information to obtain the target return path.

In an exemplary embodiment, detecting an operating state of the positioning system according to the positioning position information comprises: determining the availability of the positioning system according to the stability of the positioning position information; determining the operating state to be the abnormal state if the availability is below a target threshold.

Alternatively, in this embodiment, the relative distance is used to indicate the distance relationship of the target flight equipment to the ground control terminal, which may be but is not limited to, determined from the flying control signal received by the receiving antenna. For example: the target flight equipment receives the flight control signal sent from the ground control terminal, and the target flight equipment can calculate the distance relationship between the target flight equipment and the ground control terminal according to the time when the signal information about the flight control signal is received and the propagation speed of the flight control signal is known.

Alternatively, in this embodiment, the relative direction is used to indicate the directional relationship of the target flight equipment to the ground control terminal, which may be but is not limited to, determined from the flight control signal strength received by the receiving antenna. For example: a plurality of receiving antennas are deployed in different directions on the target flight equipment, and according to the distance from the ground control terminal in each direction, the signal strength of the control signals acquired by the receiving antennas is different, namely, the signal strength of the control signals received by the receiving antennas in the direction from the ground control terminal is the maximum.

In an exemplary embodiment, according to the relative position information, a target return path for the target flight equipment may be planned in but is not limited to, the following manner: planning a return direction of the target flight equipment based on a relative direction included in the relative position information, wherein the relative direction is a direction of the target flight equipment relative to the ground control terminal; planning the target return path according to the relative distance included in the relative position information and the return direction.

Alternatively, in the present embodiment, the return direction is a direction in which the control target flight equipment re-navigates to the ground control terminal, which may be, but is not limited to, determined according to a relative direction included in the relative position information. For example: obtaining relative position information about the control target flight equipment and the ground control terminal, wherein the relative position information comprises a relative direction for indicating the direction of the ground control terminal relative to the target flight equipment and determining the direction of returning from the target flight equipment to the ground control terminal according to the relative direction.

In an exemplary embodiment, according to the relative position information, a target return path for the target flight equipment may be planned in but is not limited to, the following manner: planning a first return path of the target flight equipment according to the relative position information; acquiring altitude information about the target flight equipment, wherein the altitude information is information collected by an altitude sensor deployed on the target flight equipment; adjusting the first return path according to the altitude information to obtain the target return path, wherein the altitude information is used for controlling the flight altitude of the target flight equipment during the return.

Alternatively, in this embodiment, the first return path may be but is not limited to, planned based on relative position information of the target flight equipment and the ground control terminal. For example: acquiring relative position information about the control target flight equipment and the ground control terminal, determining the distance and direction of the target flight equipment relative to the ground control terminal according to the relative position information, namely, the distance and the direction of the target flight equipment returning to the ground control terminal can be obtained, and then obtaining a first return path by planning the direction and the distance.

Alternatively, in this embodiment, the altitude information may be, but is not limited to, information collected by an altitude sensor deployed on the target flight equipment, and the altitude sensor may be, but is not limited to, a device capable of collecting altitude information of the target flight equipment. For example: barometers, radars, etc.

Optionally, in this embodiment, the target return path is used to indicate a route for the target flight equipment to return to the ground control terminal, which may be, but is not limited to, obtained by adjusting the first return path based on altitude information. For example: the first return path is planned according to the relative position information of the target flying equipment and the ground control terminal. However, since the relative position information only determines the distance and direction of the target flying equipment relative to the ground control terminal, and does not limit the flight altitude of the target flying equipment relative to the ground, it is necessary to obtain the altitude information of the target flying equipment relative to the ground in real-time during the return path, and adjust the return path of the target flying equipment so as to ensure that the target flying equipment keeps flying in a proper altitude and returns safely.

In an exemplary embodiment, according to the relative position information, a target return path for the target flight equipment may be planned in but is not limited to, the following manner: planning a second return path of the target flight equipment according to the relative position information; acquiring visual information about the target flight equipment, wherein the visual information is information collected by a visual sensor deployed on the target flight equipment; determining obstacle information on the second return path according to the visual information; adjusting the second return path according to the obstacle information to obtain the target return path.

Alternatively, in this embodiment, the second return path may be but is not limited to, planned based on relative position information of the target flight equipment and the ground control terminal. For example: acquiring relative position information about the control target flight equipment and the ground control terminal, determining the distance and direction of the target flight equipment relative to the ground control terminal according to the relative position information, namely, the distance and direction of the target flight equipment returning to the ground control terminal can be obtained, and then obtaining a second return path by planning the direction and the distance.

Optionally, in this embodiment, the visual information is used to determine an obstacle information on the second return path, which visual information may be, but is not limited to, information acquired by a visual sensor deployed on the target flight equipment, which visual sensor may be, but is not limited to, a device capable of acquiring image information. For example: visual sensors, video recorders, etc.

Optionally, in this embodiment, the target return path is used to indicate a route for the target flight equipment to return on the ground control side, which may be obtained but is not limited to, by adjusting the second return path based on visual information. For example: the second return path is planned according to the relative position information between the target flight equipment and the ground control terminal. However, since the relative position information only determines the distance and direction of the target flight equipment relative to the ground control terminal, and does not consider the obstacle situation that the target flight equipment may encounter during the return path, it is necessary to acquire the visual information of the target flight equipment in real-time during the return path, to identify and extract the obstacle in the visual information, and to adjust the second return path according to the obstacle information, to ensure that the target flight equipment remains in the obstacle-free space for return.

Figure 5:
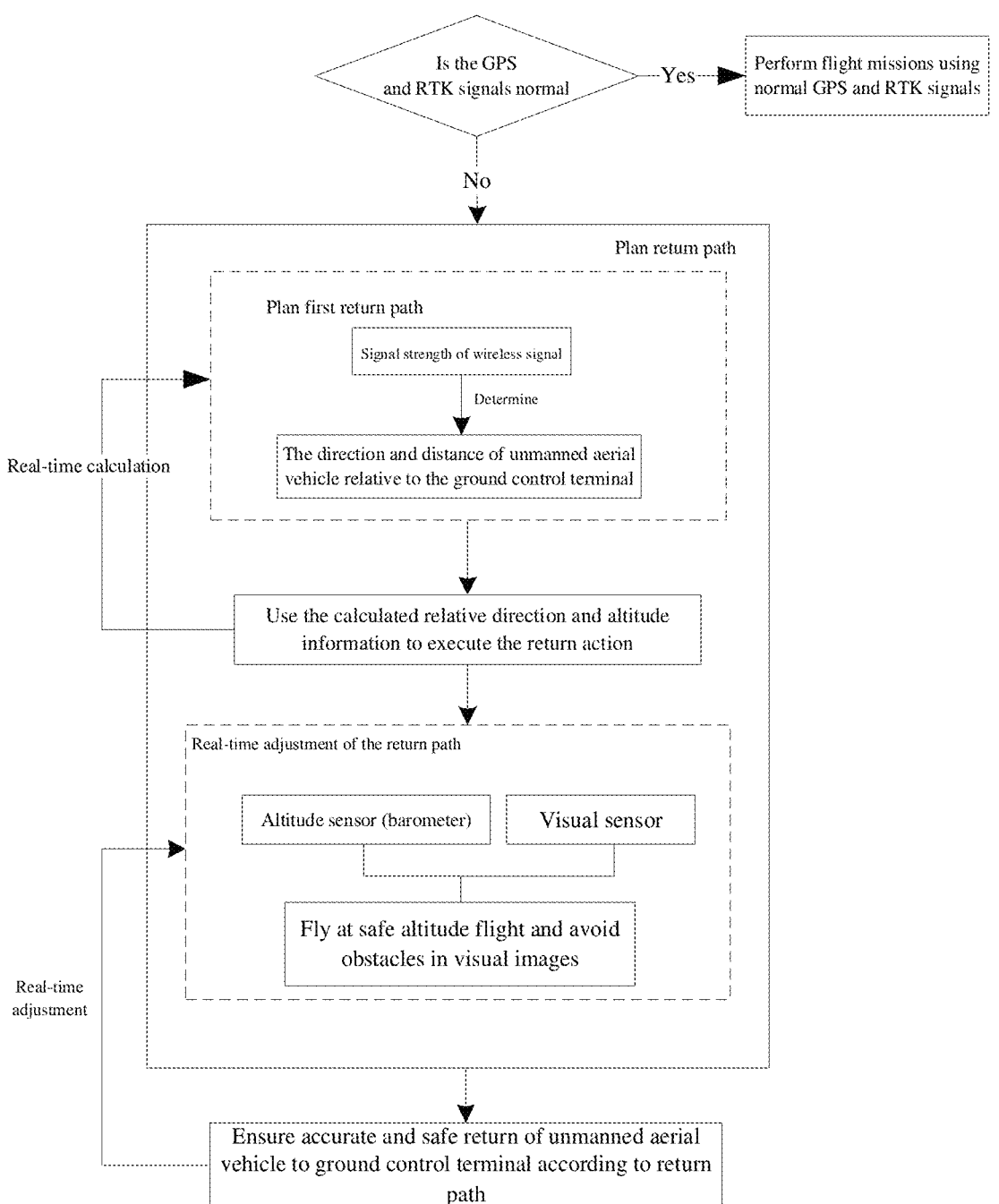
FIG. 5 is a flow chart of return when an unmanned aerial vehicle positioning system fails according to an embodiment of the present application.

Alternatively, in the present embodiment, FIG. 5 is a flow chart of return when a UAV positioning system fails according to an embodiment of the present application, as shown in FIG. 5, acquiring position information about a target flight equipment according to GPS and RTK (Real Time Kinematic, real-time differential positioning) on the target flight equipment (namely, a UAV), and using GPS and RTK to perform a flight task when the GPS and RTK work normally; In the case of abnormal operation of GPS and RTK, the return path of the target flight equipment is planned through the wireless signal acquired from the ground control terminal; first, the direction and distance of the UAV relative to the ground control terminal are determined according to the signal strength of the wireless signal of the ground control terminal to obtain a first return path; then, the target flight equipment is controlled to fly at a safe altitude according to the real-time acquired altitude sensor (namely, a barometer) and the visual sensor, and the obstacle in the visual image acquired by the visual sensor is avoided, so as to ensure that the UAV accurately and safely returns to the ground control terminal.

With the above-mentioned embodiments, under the condition that the operating state of the positioning system is an abnormal state, the UAV can be controlled to perform a return operation to the ground control terminal according to the acquired relative position information with the ground control terminal. Controlling the target UAV to return to the ground control terminal when the positioning system fails is realized, and the problem of low security of UAV control when navigation fails is solved.

From the description of the embodiments given above, it will be clear to a person skilled in the art that the method according to the embodiments described above can be implemented by means of software plus a necessary general hardware platform, but of course also by means of hardware, but in many cases the former is a better embodiment. Based on such an understanding, the technical solution of the present application, either substantively or in any way contributing to the prior art, can be embodied in the form of a software product, wherein the computer software product is stored in a storage medium (such as a ROM/RAM, a magnetic diskette, an optical disk), and comprises instructions for causing a terminal equipment (which can be a mobile phone, a computer, a server, or a network device, etc.) to execute the method of various embodiments of the present application.

In the present application, firstly, positioning position information about the target flight equipment is acquired from the positioning system deployed on the target flight equipment, and then the operating state of the positioning system is detected to be a normal state or an abnormal state according to the positioning position information; when the operating state of the positioning system of the target flight equipment is an abnormal state, controlling the target flight equipment to return to a ground control terminal according to the relative position information between the target flight equipment and the ground control terminal of the target flight equipment. That is to say, the positioning system on the target flight equipment can be monitored, and if there is a situation where the positioning system on the target flight equipment is abnormal, the target flight equipment can be controlled to return to the ground control terminal of the target flight equipment according to the position information (namely, relative position information) of the target flight equipment relative to the ground control terminal thereof, to ensure that the target flight equipment can safely reach the ground control terminal even in a state where the positioning system is abnormal. Therefore, it is possible to solve the problem of a lower safety flight equipment control when positioning navigation fails, achieving the effect of improving the safety of flight equipment control when positioning navigation fails.

There is also provided in this embodiment a device for controlling a flight equipment for carrying out the embodiments and preferred embodiments described above, which will not be described in detail. As used below, the term "module" may implement a combination of software and/or hardware for a predetermined function. Although the device described in the following embodiments is preferably implemented in software, implementations in hardware, or a combination of software and hardware, are possible and contemplated.

Figure 6:
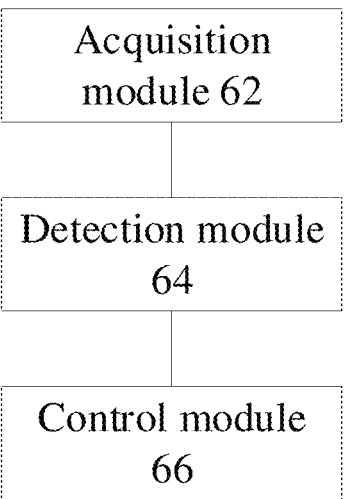
FIG. 6 is a block diagram of the structure of a device for controlling a flight equipment according to an embodiment of the present application.

FIG. 6 is a block diagram of the structure of a device for controlling a flight equipment according to an embodiment of the present application, as shown in FIG. 6, the device includes:

an acquisition module 62 for acquiring positioning position information from a positioning system deployed on a target flight equipment;

a detection module 64 for detecting an operating state of the positioning system according to positioning position information, wherein the operating state comprises: normal state and abnormal state;

a control module 66 for controlling the target flight equipment to return to a ground control terminal according to the relative position information between the target flight equipment and the ground control terminal of the target flight equipment when the operating state is an abnormal state.

By means of the above-mentioned device, firstly, positioning position information about the target flight equipment is acquired from the positioning system deployed on the target flight equipment, and then the operating state of the positioning system is detected to be a normal state or an abnormal state according to the positioning position information; when the operating state of the positioning system of the target flight equipment is an abnormal state, controlling the target flight equipment to return to a ground control terminal according to the relative position information between the target flight equipment and the ground control terminal of the target flight equipment. That is to say, the positioning system on the target flight equipment can be monitored, and if there is a situation where the positioning system on the target flight equipment is abnormal, the target flight equipment can be controlled to return to the ground control terminal of the target flight equipment according to the position information (namely, relative position information) of the target flight equipment relative to the ground control terminal thereof, to ensure that the target flight equipment can safely reach the ground control terminal even in a state where the positioning system is abnormal. Therefore, it is possible to solve the problem of a lower safety flight equipment control when positioning navigation fails, achieving the effect of improving the safety of flight equipment control when positioning navigation fails.

In an exemplary embodiment, the control module comprises:

a first determination unit used for determining the relative position information according to signal information about a flight control signal sent by the ground control terminal to the target flight equipment and antenna position information about the target flight equipment, wherein the antenna position information is used for indicating a deployment position of a receiving antenna receiving the flight control signal on the target flight equipment;

a planning unit used for planning a target return path of the target flight equipment according to the relative position information;

a control unit used for controlling the target flight equipment to return to a ground control terminal according to the target return path.

In an exemplary embodiment, the first determination unit is used for determining the signal strength of the flight control signal received by each of a plurality of the receiving antennas deployed on the target flight equipment, and the deployment position of each of the receiving antennas, to obtain a plurality of sets of the deployment positions and the signal strength having corresponding relationships, wherein the signal information comprises the signal strength; determining a relative distance and a relative direction as the relative position information, wherein the relative direction is a direction of the target flight equipment relative to the ground control terminal and the relative distance is a distance of the target flight equipment relative to the ground control terminal, according to the plurality of sets of the deployment positions and the signal strengths having corresponding relationships.

In an exemplary embodiment, the planning unit is used for planning a return direction of the target flight equipment based on a relative direction included in the relative position information, wherein the relative direction is the direction of the target flight equipment relative to the ground control terminal; planning the target return path according to the relative distance included in the relative position information and the return direction.

In an exemplary embodiment, the planning unit is used for planning a first return path of the target flight equipment according to the relative position information; acquiring altitude information about the target flight equipment, wherein the altitude information is information collected by an altitude sensor deployed on the target flight equipment; adjusting the first return path according to the altitude information to obtain the target return path, wherein the altitude information is used for controlling the flight altitude of the target flight equipment during the return.

In an exemplary embodiment, the planning unit is used for planning a second return path of the target flight equipment according to the relative position information; acquiring visual information about the target flight equipment, wherein the visual information is information collected by a visual sensor deployed on the target flight equipment; determining obstacle information on the second return path according to the visual information; adjusting the second return path according to the obstacle information to obtain the target return path.

In an exemplary embodiment, the detection module comprises:

a second determination unit for determining the availability of the positioning system according to the stability of the positioning position information;

a third determination unit for determining the operating state to be the abnormal state if the availability is below a target threshold.

It should be noted that each of the above-mentioned modules can be implemented by software or hardware, and for the latter, it can be implemented by, but not limited to: the above-mentioned modules are all located in the same processor; Alternatively, the various modules may reside in different processors in any combination.

Embodiments of the present application also provide a computer-readable storage medium having stored therein a computer program, wherein the computer program is arranged to implement the steps of any of the method embodiments described above when run on.

In the present embodiment, the computer-readable storage medium may be configured to store a computer program for performing the following steps:

S1, acquiring a positioning position information from a positioning system deployed on a target flight equipment;

S2, detecting an operating state of the positioning system according to positioning position information, wherein the operating state comprises: normal state and abnormal state; and S3, controlling the target flight equipment to return to a ground control terminal according to the relative position information between the target flight equipment and the ground control terminal of the target flight equipment when the operating state is an abnormal state.

In an exemplary embodiment, the computer-readable storage medium may include, but is not limited to: USB disk, read-only memory (ROM), random access memory (RAM), removable hard disk, and magnetic or optical disk can store computer programs.

Embodiments of the present application also provide an electronic device comprising a memory and a processor, the memory having stored therein a computer program, the processor being arranged to run the computer program to perform the steps in any of the method embodiments described above.

In an exemplary embodiment, the electronic device may further comprise a transmission equipment coupled to the processor and an input-output device coupled to the processor.

In an exemplary embodiment, the processor may be arranged to perform the following steps by means of a computer program:

S1, acquiring a positioning position information from a positioning system deployed on a target flight equipment;

S2, detecting an operating state of the positioning system according to positioning position information, wherein the operating state comprises: normal state and abnormal state; and S3, controlling the target flight equipment to return to a ground control terminal according to the relative position information between the target flight equipment and the ground control terminal of the target flight equipment when the operating state is an abnormal state.

Specific examples in the present embodiment may refer to the examples described in the above embodiments and exemplary embodiments, and the present embodiment will not be described in detail herein.

It will be apparent to those skilled in the art that the modules or steps of the present application described above may be implemented by general-purpose computing devices, may be centralized on a single computing device, or may be distributed over a network of multiple computing devices, may be implemented in program code executable by the computing devices, may be stored in a storage device for execution by the computing devices, and in some instances, the steps shown or described may be performed in an order other than that described herein, or may be separately fabricated into integrated circuit modules, or multiple modules or steps thereof may be implemented as a single integrated circuit module. As such, the present application is not limited to any particular combination of hardware and software.

The above are only preferred examples of the present application and are not intended to limit the present application. For those skilled in the art, the present application may have various modifications and changes. Any modification, equivalent replacement, improvement, etc. made within the principle of the present application should be included in the protection scope of the present application.

What is claimed is:

1. A method for controlling a flight equipment, the method comprising:

acquiring a positioning position information from a positioning system deployed on a target flight equipment;

detecting an operating state of the positioning system according to the positioning position information, wherein the operating state comprises: normal state and abnormal state;

controlling the target flight equipment to return to a ground control terminal of the target flight equipment according to the relative position information between the target flight equipment and the ground control terminal when the operating state is an abnormal state, the relative position information being determined from a wireless signal between the target flight equipment and the ground control terminal;

wherein the detecting the operating state of the positioning system according to the positioning position information comprises:

setting a precision threshold value for an accuracy of the positioning position information acquired by the positioning system of the target flight equipment;

determining the accuracy of the positioning position information in a normal state when a difference of the positioning position information at adjacent time points falls within the precision threshold value;

setting a time threshold value for the time when the positioning position information is continuously acquired by the positioning system of the target flight equipment;

accumulating the positioning position information with the normal accuracy; and determining that the positioning position information acquired by the positioning system of the target flight equipment is in an unstable state when the time when the positioning position information with the normal accuracy is continuously acquired exceeds the time threshold value, so as to determine that the operating state is the abnormal state.

2. The method according to claim 1, wherein the controlling the target flight equipment to return to the ground control terminal of the target flight equipment according to the relative position information between the target flight equipment and the ground control terminal further comprises:

determining the relative position information according to a signal information about a flight control signal sent by the ground control terminal to the target flight equipment and an antenna position information about the target flight equipment, wherein the antenna position information is configured to indicate a deployment position of a receiving antenna receiving the flight control signal on the target flight equipment;

planning a target return path of the target flight equipment according to the relative position information;

controlling the target flight equipment to return to the ground control terminal according to the target return path.

3. The method according to claim 2, wherein the determining the relative position information according to the signal information about the flight control signal sent by the ground control terminal to the target flight equipment and the antenna position information about the target flight equipment further comprises:

determining a signal strength of the flight control signal received by each of a plurality of the receiving antennas deployed on the target flight equipment, and the deployment position of each of the receiving antennas, to obtain a plurality of sets of the deployment positions and the signal strengths having corresponding relationships, wherein the signal information comprises the signal strength;

determining a relative distance and a relative direction as the relative position information, wherein the relative direction is a direction of the target flight equipment relative to the ground control terminal and the relative distance is a distance of the target flight equipment relative to the ground control terminal, according to the plurality of sets of the deployment positions and the signal strengths having corresponding relationships.

4. The method according to claim 2, wherein the planning the target return path of the target flight equipment according to the relative position information further comprises:

planning a return direction of the target flight equipment based on a relative direction included in the relative position information, wherein the relative direction is a direction of the target flight equipment relative to the ground control terminal;

planning the target return path according to the relative distance included in the relative position information and the return direction.

5. The method according to claim 2, wherein the planning the target return path of the target flight equipment according to the relative position information further comprises:

planning a first return path of the target flight equipment according to the relative position information;

acquiring an altitude information about the target flight equipment, wherein the altitude information is information collected by an altitude sensor deployed on the target flight equipment;

adjusting the first return path according to the altitude information to obtain the target return path, wherein the altitude information is configured to control the flight altitude of the target flight equipment during the return.

6. The method according to claim 2, wherein the planning the target return path of the target flight equipment according to the relative position information further comprises:

planning a second return path of the target flight equipment according to the relative position information;

acquiring a visual information about the target flight equipment, wherein the visual information is information collected by a visual sensor deployed on the target flight equipment;

determining an obstacle information on the second return path according to the visual information;

adjusting the second return path according to the obstacle information to obtain the target return path.

7. A control device for a flight equipment, comprising:

an acquisition module for acquiring a positioning position information from a positioning system deployed on a target flight equipment;

a detection module for detecting an operating state of the positioning system according to the positioning position information, wherein the operating state comprises: normal state and abnormal state;

a control module for controlling the target flight equipment to return to a ground control terminal of the target flight equipment according to a relative position information between the target flight equipment and the ground control terminal when the operating state is the abnormal state, the relative position information being determined from a wireless signal between the target flight equipment and the ground control terminal;

wherein the detection module for detecting the operating state of the positioning system according to the positioning position information comprises:

setting a precision threshold value for an accuracy of the positioning position information acquired by the positioning system of the target flight equipment;

determining the accuracy of the positioning position information in a normal state when a difference of the positioning position information at adjacent time points falls within the precision threshold value;

setting a time threshold value for the time when the positioning position information is continuously acquired by the positioning system of the target flight equipment;

accumulating the positioning position information with the normal accuracy; and determining that the positioning position information acquired by the positioning system of the target flight equipment is in an unstable state when the time when the positioning position information with the normal accuracy is continuously acquired exceeds the time threshold value, so as to determine that the operating state is the abnormal state.

8. The control device according to claim 7, wherein the control module for controlling the target flight equipment to return to the ground control terminal of the target flight equipment according to the relative position information between the target flight equipment and the ground control terminal equipment further comprises:

determining the relative position information according to a signal information about a flight control signal sent by the ground control terminal to the target flight equipment and an antenna position information about the target flight equipment, wherein the antenna position information is configured to indicate a deployment position of a receiving antenna receiving the flight control signal on the target flight equipment;

planning a target return path of the target flight equipment according to the relative position information;

controlling the target flight equipment to return to the ground control terminal according to the target return path.

9. The control device according to claim 8, wherein the determining the relative position information according to the signal information about the flight control signal sent by the ground control terminal to the target flight equipment and the antenna position information about the target flight equipment further comprises:

determining a signal strength of the flight control signal received by each of a plurality of the receiving antennas deployed on the target flight equipment, and the deployment position of each of the receiving antennas, to obtain a plurality of sets of the deployment positions and the signal strengths having corresponding relationships, wherein the signal information comprises the signal strength;

determining a relative distance and a relative direction as the relative position information, wherein the relative direction is a direction of the target flight equipment relative to the ground control terminal and the relative distance is a distance of the target flight equipment relative to the ground control terminal, according to the plurality of sets of the deployment positions and the signal strengths having corresponding relationships.

10. The control device according to claim 9, wherein the planning the target return path of the target flight equipment according to the relative position information further comprises:

planning a return direction of the target flight equipment based on a relative direction included in the relative position information, wherein the relative direction is a direction of the target flight equipment relative to the ground control terminal;

planning the target return path according to the relative distance included in the relative position information and the return direction.

11. The control device according to claim 9, wherein the planning the target return path of the target flight equipment according to the relative position information further comprises:

planning a first return path of the target flight equipment according to the relative position information;

acquiring an altitude information about the target flight equipment, wherein the altitude information is information collected by an altitude sensor deployed on the target flight equipment;

adjusting the first return path according to the altitude information to obtain the target return path, wherein the altitude information is configured to control the flight altitude of the target flight equipment during the return.

12. The control device according to claim 9, wherein the planning the target return path of the target flight equipment according to the relative position information further comprises:

planning a second return path of the target flight equipment according to the relative position information;

acquiring a visual information about the target flight equipment, wherein the visual information is information collected by a visual sensor deployed on the target flight equipment;

determining an obstacle information on the second return path according to the visual information;

adjusting the second return path according to the obstacle information to obtain the target return path.

13. An electronic device comprising a memory, a processor, and a computer program stored on the memory and executable on the processor, wherein the processor, when executing the computer program, implements the steps of the method for controlling a flight equipment, the method comprising:

acquiring a positioning position information from a positioning system deployed on a target flight equipment;

detecting an operating state of the positioning system according to the positioning position information, wherein the operating state comprises: normal state and abnormal state;

controlling the target flight equipment to return to a ground control terminal of the target flight equipment according to the relative position information between the target flight equipment and the ground control terminal of when the operating state is an abnormal state, the relative position information being determined from a wireless signal between the target flight equipment and the ground control terminal;

wherein the detecting the operating state of the positioning system according to the positioning position information comprises:

setting a precision threshold value for an accuracy of the positioning position information acquired by the positioning system of the target flight equipment;

determining the accuracy of the positioning position information in a normal state when a difference of the positioning position information at adjacent time points falls within the precision threshold value;

setting a time threshold value for the time when the positioning position information is continuously acquired by the positioning system of the target flight equipment;

accumulating the positioning position information with the normal accuracy; and determining that the positioning position information acquired by the positioning system of the target flight equipment is in an unstable state when the time when the positioning position information with the normal accuracy is continuously acquired exceeds the time threshold value, so as to determine that the operating state is the abnormal state.

14. The electronic device according to claim 13, wherein the controlling the target flight equipment to return to the ground control terminal of the target flight equipment according to the relative position information between the target flight equipment and the ground control terminal further comprises:

determining the relative position information according to a signal information about a flight control signal sent by the ground control terminal to the target flight equipment and an antenna position information about the target flight equipment, wherein the antenna position information is configured to indicate a deployment position of a receiving antenna receiving the flight control signal on the target flight equipment;

planning a target return path of the target flight equipment according to the relative position information;

controlling the target flight equipment to return to the ground control terminal according to the target return path.

15. The electronic device according to claim 14, wherein the planning the target return path of the target flight equipment according to the relative position information further comprises:

planning a return direction of the target flight equipment based on a relative direction included in the relative position information, wherein the relative direction is a direction of the target flight equipment relative to the ground control terminal;

planning the target return path according to the relative distance included in the relative position information and the return direction.

16. The electronic device according to claim 14, wherein the planning the target return path of the target flight equipment according to the relative position information further comprises:

planning a first return path of the target flight equipment according to the relative position information;

acquiring an altitude information about the target flight equipment, wherein the altitude information is information collected by an altitude sensor deployed on the target flight equipment;

adjusting the first return path according to the altitude information to obtain the target return path, wherein the altitude information is configured to control the flight altitude of the target flight equipment during the return.

17. The electronic device according to claim 14, wherein the determining the relative position information according to the signal information about the flight control signal sent by the ground control terminal to the target flight equipment and the antenna position information about the target flight equipment further comprises:

determining a signal strength of the flight control signal received by each of a plurality of the receiving antennas deployed on the target flight equipment, and the deployment position of each of the receiving antennas, to obtain a plurality of sets of the deployment positions and the signal strengths having corresponding relationships, wherein the signal information comprises the signal strength;

determining a relative distance and a relative direction as the relative position information, wherein the relative direction is a direction of the target flight equipment relative to the ground control terminal and the relative distance is a distance of the target flight equipment relative to the ground control terminal, according to the plurality of sets of the deployment positions and the signal strengths having corresponding relationships.

* * * * *